United States Patent Office 3,224,867
Patented Dec. 21, 1965

3,224,867
METHOD OF TREATING AND CONDITIONING SOIL WITH A HEAT REACTION PRODUCT OF STARCH GRANULES AND AN ALKALI METAL PHOSPHATE
Robert L. Milloch, New York, N.Y., assignor to American Maize-Products Company, a corporation of Maine
No Drawing. Filed June 29, 1962, Ser. No. 206,174
5 Claims. (Cl. 71—27)

This invention relates to soil conditioner compositions and to a method of treating and conditioning soil with the same so as to improve the capacity of the soil to retain moisture and preserve a proper air-moisture balance over periods of varying atmospheric conditions, and to reduce erosion and similar adverse effects.

It is known that the moisture content of soil, particularly in cultivated land, is one of the most important factors affecting its structure and productivity. Optimum soil structure for plant growth is considered to be that of a porous crumb, containing by volume about 50% solid material and 50% pore space. The pore space can be occupied by air and water in varying ratios but, again for optimum plant growth, water should comprise about 25–30% of the soil volume. Hence, if the soil is deprived of moisture, its crumb structure eventually breaks down and the resulting loss of cohesiveness leads to wind and water erosion as well as infertility.

The art has suggested use of various materials as soil conditioners for improving water-retention properties among which are certain carbohydrates such as starch. Starch however, upon drying, tends to cake the soil giving rise to the so-called case hardening effect which makes it extremely difficult to rewet the soil and maintain a proper air-moisture balance therein. Other materials such as inorganic phosphate salts, while excellent sources of plant foods, are too readily water soluble and dissipated from water drainage and run-off to be of aid in increasing significantly the moisture retention capacity of the soil.

It has now been found that the application of a starch phosphate to soil surprisingly and unexpectedly increases the water-retention capacity of the soil to a substantial degree beyond that which can be obtained from use of an admixture of starch and an inorganic phosphate salt. In some yet unexplained manner, a synergistic effect is achieved by use of a starch compound, in which starch is chemically combined with a phosphate, as the essential active ingredient of soil conditioner compositions whereby the increased water-retention capacity of the soil far exceeds any increase resulting from use of the starch and phosphate components themselves, alone or in physical admixture. Furthermore, the novel effect achieved by the present invention continues over a longer than usual time period, even though the starch phosphate itself is water soluble and would be expected to dissipate rapidly from water drainage and run-off. This again has not yet been fully explainable, although it is believed that the very high film-forming capacity of the starch phosphate coupled with its water solubility is at least partly the reason why the long term effect is achieved. Thus, during relatively dry atmospheric conditions, the starch phosphate can form a film at or near the soil surface which will reduce to a large extent evaporation of water from within the soil. On the other hand, during periods of rain or like wet conditions, water can readily dissolve and penetrate through the starch phosphate film to raise the moisture content of the soil to optimum levels. This process of alternate film formation and dissolution, it is believed, repeats itself until the concentration of starch phosphate is reduced to levels insufficient for film formation by gradual hydrolysis or other chemical decomposition.

One of the most important benefits of the invention is the fact that the case hardening effect is practically eliminated through use of starch phosphate as the active ingredient of soil conditioner compositions. Thus, the starch phosphate may be applied to the soil without the danger that the soil will cake and become difficult to rewet because of hot, dry atmospheric conditions. In effect, the starch phosphate not only significantly improves the water retention capacity of the soil initially, but also ensures that over periods of varying moist and dry atmospheric conditions the moisture content of the soil can be readily replenished and a proper air-moisture balance restored therein for optimum plant growth. In addition to maintaining soil productivity, this reduces to a great extent soil deterioration from wind and water erosion. Furthermore, actual tests have demonstrated that the starch phosphate will provide the increased amounts of readily accessible moisture to germinating seeds and seedlings without choking off or causing rotting of such new plant growth. Eventual break down of the starch phosphate, for example by slow hydrolysis induced by the humic acids in the soil, is also of benefit since important plant nutrients in assimilable form are thereby released into the soil.

Preparation of starch phosphates which may be employed as active ingredients of soil conditioner compositions in accordance with the present invention is described in United States Patents Nos. 2,884,412 and 2,993,041. The general procedure is to impregnate starch granules with a solution of an alkali metal phosphate salt, dry the granules and then heat the granules to reaction temperatures of 120 to 175° C. for about 1 to 15 hours. Any starch phosphate prepared in this manner may be employed in the present invention. Products resulting from reaction between starch and potassium phosphate salts are of particular advantages since these will introduce the important plant nutrient potassium ion as well as improve the water-retention capacity of the soil. From the foregoing general description and the further details given in the above two U.S. patents, it will be noted that the starch phosphates which are to be used in this invention may be characterized as a heat reaction product of starch granules and an alkali metal phosphate salt absorbed therein, said reaction product being formed at temperatures from about 120° C. to about 175° C. and in the absence of unabsorbed water.

The starch phosphate, alone or mixed with other soil chemicals, may be applied to the soil as a dry powder or in a water solution. Dry application may be of advantage in various circumstances as, for example, where the land area to be treated is already saturated with water and no further deposition of water upon the land is wanted at the moment. Use of dry starch phosphate also will usually be more convenient in greenhouses or potting operations where relatively small quantities of soil are to be treated and the moisture content of the soil can be somewhat controlled externally. Application of the starch phosphate in the form of an aqueous solution will be of advantage where large land areas need to be treated or where the soil to be treated is in a relatively dry condition. In the latter case, an important advantage is that as the moisture content of the soil is replenished, the starch phosphate is simultaneously added to act immediately in improving the capacity of the dry soil to retain the moisture that is supplied to it by the aqueous solution. The concentration of the starch phosphate in the aqueous solution may be varied over a wide range of proportions with satisfactory results. In general, solutions containing from about 1 to 10% starch phosphate by weight may be employed.

If desired, other conventional substances desired in the soil may be applied simultaneously with the dry or dissolved starch phosphate. As a matter of fact, it is a feature of the invention that virtually all types and mixtures of conventional soil improvement materials can be further potentiated, in terms of capability to improve moisture-retention capacity, by addition of the starch phosphate thereto as an essential active ingredient. For example, soil stabilizers such as hydrolyzed polyacrylonitrile, carboxymethylcellulose and similar resins or other agricultural materials such as fertilizers, herbicides, insecticides and fungicides may be mixed with the starch phosphate prior to application. The starch phosphate may be even added to special high quality grades of soil alone and this soil then used as a top layer dressing for land containing poorer quality soils.

In one particular embodiment of the invention, grass seed is mixed with the starch phosphate, dry or in aqueous solution, and the resulting composition then applied to soil to both seed the area being treated and improve the water-retention capacity thereof at the same time. This has been found to promote significantly uniform grass growth with a minimum of bare, choked-off patches due to over-planting. This method may be generally employed with other types of plant seeds as well. If desired, a viscous solution of the starch phosphate can be applied to plant seeds and then dehydrated to form a starch phosphate coating around the seeds. The close proximity of the starch phosphate to the roots formed out of such seeds will be of added benefit for plant growth.

In addition to the foregoing, other materials such as tar or asphalt emulsions and waste fly ash or similar non-toxic carbonaceous aggregates may be employed in combination with the starch phosphate as diluents or bulking ingredients. Where the starch phosphate is mixed only withe non-toxic soil improvement solids so that a dry preparation is to be applied to the soil, the proportions of starch phosphate in the mixture may be from about 1% to about 30% by weight of the mixture. Such proportions may be exceeded if desired as they have been found to be advantageous, but not essential.

The amount of starch phosphate that is to be incorporated in the soil may vary over a wide range of proportions. As little as 0.05% starch phosphate, calculated on the quantity of soil, will be effective in improving water-retention capacity. On the other hand, the amount of starch phosphate may vary up to about 10% in all applications, while in particular cases even higher percentages may be employed. In general, excellent results may be achieved with from about 1 to about 3% starch phosphate and these proportions are preferred.

The starch phosphate, dry or in aqueous solution, and alone or in combination with any additional ingredients, may be applied to the soil in conventional manner. The various well-known devices for applying conventional soil chemicals are suitable for this purpose and need not be described in detail here.

The invention is further described and illustrated in the following examples which, in the opinion of the inventor, constitute preferred embodiments thereof.

*Example 1*

Into four kilogram samples of top soil was uniformly mixed 0.5, 1, 2 and 5% respectively by weight of the reaction product of corn starch and a mixture of di and trisodium phosphates, prepared in accordance with the method described in U.S. Patent No. 2,884,412. Each sample was then planted with an equal amount of commercial grass seed and watered to raise the moisture content of the soil to 25% by volume. A fifth kilogram sample of the top soil was treated in the same manner except that the starch phosphate reaction product was omitted.

All of the samples were permitted to stand exposed to sunlight passing through a closed window for eight weeks. During this period, the samples were watered with the equal quantities of water every other day. On the alternate days before watering, it was noted consistently that the dryness of the soil samples varied inversely with the concentration of starch phosphate therein, that is to say, the control sample with no starch phosphate always dried to the greatest degree while the soil sample containing 5% starch phosphate retained the largest amount of moisture. Also, the grass growth was more uniform and vigorous as the concentration of starch phosphate in the samples increased.

*Example 2*

The procedure of Example 1 is repeated except that the reaction product of starch and dilithium phosphate is employed in the soil samples. The results are the same as those observed in Example 1.

*Example 3*

The procedure of Example 1 is repeated except that the reaction product of starch and trisodium phosphate is used in the soil samples. The results are again equivalent to those observed in Example 1.

It will be understood that it is intended to cover all changes and modifications of the preferred embodiments of the invention, herein chosen for the purpose of illustration, which do not constitute departures from the spirit and scope of the invention.

The following is claimed:

1. A method of treating and conditioning soil consisting essentially of applying to the soil a heat reaction product of starch granules and an alkali metal phosphate salt, said reaction product being formed by mixing starch granules with an aqueous solution of the phosphate salt to cause the granules to absorb some of the solution, then separating the starch granules from any excess phosphate salt solution which has not been absorbed by the starch granules, and then roasting the separated starch granules containing the absorbed phosphate salt at temperatures from about 120° C. to about 175° C.

2. A method of treating and conditioning soil consisting essentially of applying to the soil from about 0.05% to 10% by weight of a heat reaction product of starch granules and an alkali metal phosphate salt, said reaction product being formed by mixing starch granules with an aqueous solution of the phosphate salt to cause the granules to absorb some of the solution, then separating the starch granules from any excess phosphate salt solution which has not been absorbed by the starch granules, and then roasting the separated starch granules containing the absorbed phosphate salt at temperatures from about 120° C. to about 175° C.

3. A method of treating and conditioning soil consisting essentially of dissolving in water a heat reaction product of starch granules and an alkali metal phosphate salt, and then applying the solution so prepared to the soil, said reaction product being formed by mixing starch granules with an aqueous solution of the phosphate salt to cause the granules to absorb some of the solution, then separating the starch granules from any excess phosphate salt solution which has not been absorbed by the starch granules, and then roasting the separated starch granules containing the absorbed phosphate salt at temperatures from about 120° C. to about 175° C.

4. A method of treating and conditioning soil consisting essentially of dissolving in water a heat reaction product of starch granules and an alkali metal phosphate salt, suspending plant seeds in the resulting solution and then applying the suspension so prepared to the surface of the soil, said reaction product being formed by mixing starch granules with an aqueous solution of the phosphate salt to cause the granules to absorb some of the solution, then separating the starch granules from any excess phosphate salt solution which has not been absorbed by the starch granules, and then roasting the separated starch granules containing the absorbed phosphate salt at temperatures from about 120° C. to about 175° C.

5. A method as in claim 4 wherein said plant seeds are grass seeds.

References Cited by the Examiner

UNITED STATES PATENTS

| | | | |
|---|---|---|---|
| 128,752 | 7/1872 | Pratt | 71—23 |
| 1,319,157 | 10/1919 | Lingle. | |
| 2,553,577 | 5/1951 | Hale et al. | |
| 2,884,412 | 4/1959 | Neukom | 127—33 |
| 2,912,317 | 11/1959 | Gloss | 71—64 |
| 2,936,226 | 5/1960 | Kaufman | 71—64 |
| 2,957,834 | 10/1960 | Moller et al. | |
| 2,993,041 | 7/1961 | Sietsema et al. | 127—33 |

FOREIGN PATENTS 411,040  3/1925  Germany.

DONALL H. SYLVESTER, *Primary Examiner.*

ANTHONY SCIAMANNA, *Examiner.*